United States Patent [19]

Lippert et al.

[11] Patent Number: 5,143,691
[45] Date of Patent: Sep. 1, 1992

[54] FUEL ASSEMBLY WITH FLOW TRIPPER FOR A BOILING WATER REACTOR

[75] Inventors: Hans-Joachim Lippert, Höchstadt/Aisch; Wendelin Kraemer, Frankfurt am Main, both of Fed. Rep. of Germany

[73] Assignee: Siemens Aktiengesellschaft, Munich, Fed. Rep. of Germany

[21] Appl. No.: 619,903

[22] Filed: Nov. 28, 1990

[30] Foreign Application Priority Data

Nov. 29, 1989 [EP] European Pat. Off. ........ 89121996.6

[51] Int. Cl.$^5$ ............................................. G21C 3/32
[52] U.S. Cl. .................... 376/443; 376/438; 376/439; 376/444
[58] Field of Search ............... 376/443, 444, 439, 448, 376/438, 434, 457

[56] References Cited

U.S. PATENT DOCUMENTS

| | | | |
|---|---|---|---|
| 4,749,543 | 6/1988 | Crowther et al. | 376/443 |
| 4,775,510 | 10/1988 | Bryan | 376/443 |
| 5,002,725 | 3/1991 | Lettau et al. | 376/444 |

FOREIGN PATENT DOCUMENTS 8802565  6/1988  Fed. Rep. of Germany .
2208749  4/1988  United Kingdom .

*Primary Examiner*—Brooks H. Hunt
*Assistant Examiner*—Meena Chelliah
*Attorney, Agent, or Firm*—Herbert L. Lerner; Laurence A. Greenberg

[57] ABSTRACT

A fuel assembly for a boiling water reactor includes an elongated case having an interior and inner surfaces. A base part has inlet openings discharging into the interior of the case for coolant flowing in a given flow direction and a head part has outlet openings leading out of the interior of the case for the coolant flowing in the given flow direction. Mutually parallel fuel rods containing nuclear fuel are disposed in the case between the base and head parts. The inner surfaces of the case have a profile with a rectilinear alignment as seen in the given flow direction and flow trippers extending transversely to the alignment in the form of bulges protruding inward in the given flow direction. Each of the bulges has a sloped surface facing toward the coolant with an impact surface substantially perpendicular to the given flow direction.

11 Claims, 6 Drawing Sheets

FUEL ASSEMBLY WITH FLOW TRIPPER FOR A BOILING WATER REACTOR

The invention relates to a fuel assembly for a boiling water reactor, having mutually parallel fuel rods containing nuclear fuel and being disposed in an elongated case between a base part such as a lower tie plate, having inlet openings discharging into the interior of the case for flowing coolant and a head or cap part such as an upper tie plate, having outlet openings for the flowing coolant leading out of the interior of the case, the inner surfaces of the case having a profile with an alignment extending rectilinearly as seen in the flow direction and with flow trippers extending transversely to the alignment.

When constructing a fuel assembly, various and sometimes mutually contradictory conditions must be considered, in order to optimize the production and flow of thermal neutrons, to increase steam production at the active fuel rods, to assure adequate mechanical stability and corrosion resistance, and to preclude other factors, such as corrosion or thermal changes.

The fuel rods containing the nuclear fuel, such as uranium dioxide or uranium-plutonium mixed oxides, are held by mechanical fixtures that simultaneously provide guidance for the flow of water and steam and form the so-called skeleton of the fuel assemblies as well. The fuel rods are disposed longitudinally parallel to one another inside a fuel assembly case which extends longitudinally between a base part and a cap part, such as a lower and upper tie plate, and through which water flows. The water enters through openings in the base part, flows along the fuel rods as partial evaporation occurs, evaporates to a large extent on the hot surfaces of the rods, and emerges through outlet openings of the cap part in the form of a mixture of water and steam.

In order to attain high heat transfer with high critical power (boiling output) and the most favorable cooling at the fuel he longitudinal axis of the case. To this end, suitable feed devices are provided in a closed water cycle or circuit extending from the outlet openings through a steam turbine to the inlet openings of the case. Non-boiling water for slowing down the neutrons and a controllable absorber for controlling the neutron balance are located outside the case. In order to keep the neutron absorption low within the active zone of the reactor, a special material, as a rule a zirconium alloy, is used at that location for the skeletal parts and in particular for the fuel assembly case. However, that material has little mechanical strength. The pressure difference between the interior and exterior of the case can therefore buckle the case a little. In order to improve the neutron flow, some of the positions provided for the fuel rods in the interior of the case are often occupied by so-called "water rods", that is channels which are in the form of fuel rods, but which carry non-boiling water. It has also already been proposed in German Petty Patent G 88 02 565.9 which deals with a case having a square cross section, to use a water channel having a cross section which is in the form of a regular polygon, in particular a square. Accordingly, the water channels are laterally closed off from the fuel rods by inner walls extending in the interior of the case, parallel to the fuel rods. It may be advantageous in such a case to place flow tabs or baffles in the intermediate spaces between the channels and the case walls in order to effect a favorable distribution of vapor and liquid within the coolant flow, so that the fuel rods are acted upon uniformly by water. In particular, the flow tabs or baffles may be attached to grid-like structures, which serve as spacers for the fuel rods.

In order to increase mechanical strength, Published European Application No. 89 119 176.9 proposes providing inner walls in the case that interconnect oppositely disposed case walls. In such a device it is advantageous if the inner walls are constructed as a unit along with the spacers, fuel rods and suitable fasteners for the fuel rods in the cap part and the base part. Such a unit is displaceable relative to the case wall so that the case can be removed from the fuel assembly for inspection.

In order to optimize the various requirements of a fuel assembly, U.S. Pat. No. 4,749,543 proposes a profile for the outer surfaces of the case that forms a reinforcing case wall at the corners of the square case and above all forms wall reinforcements in the lower part of the case that extend longitudinally and/or transversely. Due to the reinforcements, a relatively small wall thickness in the regions located between the reinforcements is then sufficient so that less neutron-absorbing material is needed overall for the case.

Additionally, grooves extending at right angles to the flow direction are milled into the inner surfaces of the case walls. On one hand, as flow trippers have the task of detaching or separating a liquid flow creeping along the inner surfaces of the case and incorporating it in the form of liquid droplets into the flow of the boiling water. In the upper third of the fuel assembly, where the boiling water flow increasingly includes vapor because of the evaporation of water on the hot fuel rods, this feature is intended to supply a higher proportion of liquid water to the fuel rods. On the other hand, by increasing the flow cross section, the grooves are intended to counteract a pressure produced by the increase in volume upon evaporation, while in order to maintain the mechanical strength in the region where the wall thickness is reduced by the grooves, the outer surfaces of the case walls have the aforementioned profile, which provides reinforcement regions of correspondingly increased wall thickness.

It is accordingly an object of the invention to provide a fuel assembly with flow trippers for a boiling water reactor, which overcomes the hereinafore-mentioned disadvantages of the heretofore-known devices of this general type and which has improved flow trippers. These flow trippers are intended to detach or separate the liquid film which carries unused coolant at the case walls, and to direct it at the surfaces of the fuel rods. This provides better cooling and more favorable heat transfer as well as increased critical power at the fuel rods, but at same time, the mechanical stability, and the neutron flow distribution should not be disturbed, if at all possible.

With the foregoing and other objects in view there is provided, in accordance with the invention, a fuel assembly for a boiling water reactor, comprising an elongated case having an interior and inner surfaces, a base part usually a lower tie plate having inlet openings discharging into the interior of the case for coolant flowing in a given flow direction, a head or cap usually an upper tie plate part having outlet openings leading out of the interior of the case for the coolant flowing in the given flow direction, mutually parallel fuel rods containing nuclear fuel and being disposed in the case between the base and head parts, the inner surfaces of the case having a profile with a straight or rectilinear alignment as seen in the given flow direction and flow trippers extending transversely to the alignment in the form of bulges protruding inward into the given flow direction and slightly reducing the flow cross section for the coolant, each of the bulges having a sloped surface facing toward the coolant flow with an impact surface substantially perpendicular to the given flow direction.

In accordance with another feature of the invention, the case has wall parts with a substantially constant wall thickness, the bulges are formed by bending the case wall parts, and the impact surfaces are formed by removing material from the sloped surfaces.

In accordance with a further feature of the invention, the case has wall parts with a substantially constant wall thickness, and the bulges are formed of additional wall material disposed on the case wall parts.

In accordance with an added feature of the invention, the additional wall material is welded on.

In accordance with an additional feature of the invention, the additional wall material is welding material, and the impact surfaces are formed by mechanical removal of part of the welding material.

In accordance with yet another feature of the invention, the additional wall material is in the form of reinforcing metal sheets welded to the wall parts, and the reinforcing sheets have a profile forming the bulges and the impact surfaces In accordance with yet a further feature of the invention, the additional wall material is in the form of ribs being attached to the inner surface of the case and perpendicular to the alignment.

In accordance with yet an added feature of the invention, the case has upper and lower portions, and the bulges are disposed only in the upper portion.

In accordance with yet an additional feature of the invention, there are provided spacers disposed in the case, the spacers having ribs between the fuel rods extending perpendicular to the longitudinal axis of the case, and each of the bulges being disposed upstream of a respective one of the spacers as seen in the given flow direction.

In accordance with a concomitant feature of the invention, there are provided inner walls being attached to the case in the interior of the case, the inner walls having the inner surfaces with the impact surfaces disposed substantially perpendicular to the given flow direction.

Other features which are considered as characteristic for the invention are set forth in the appended claims.

Although the invention is illustrated and described herein as embodied in a fuel assembly with a flow tripper for a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

Figure 9:
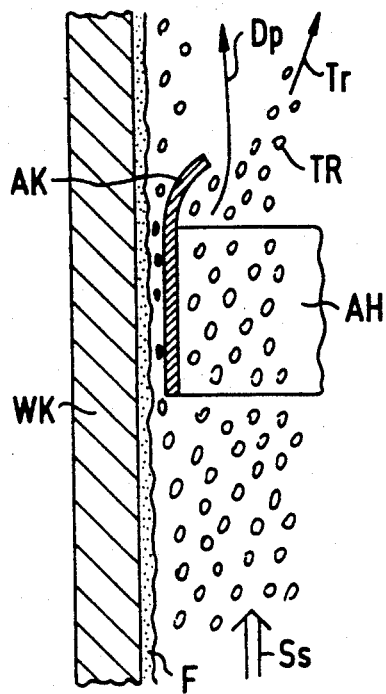
Figure 10:
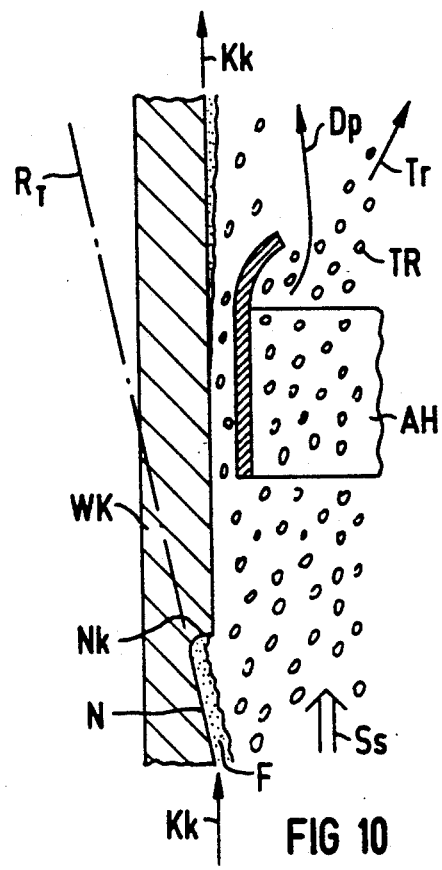
Figure 11:
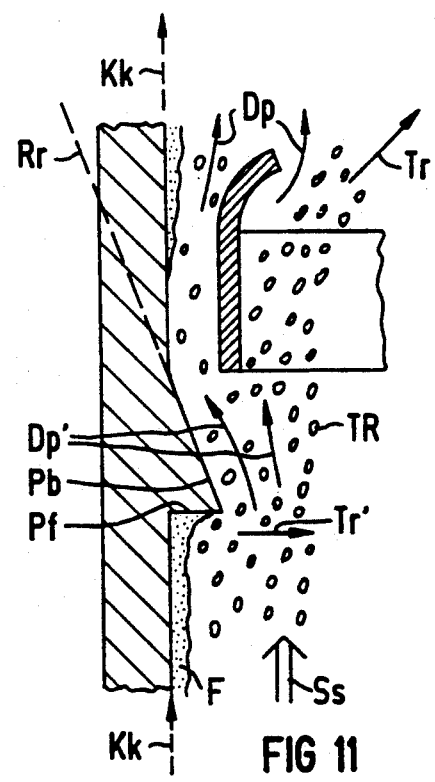
Figure 12:
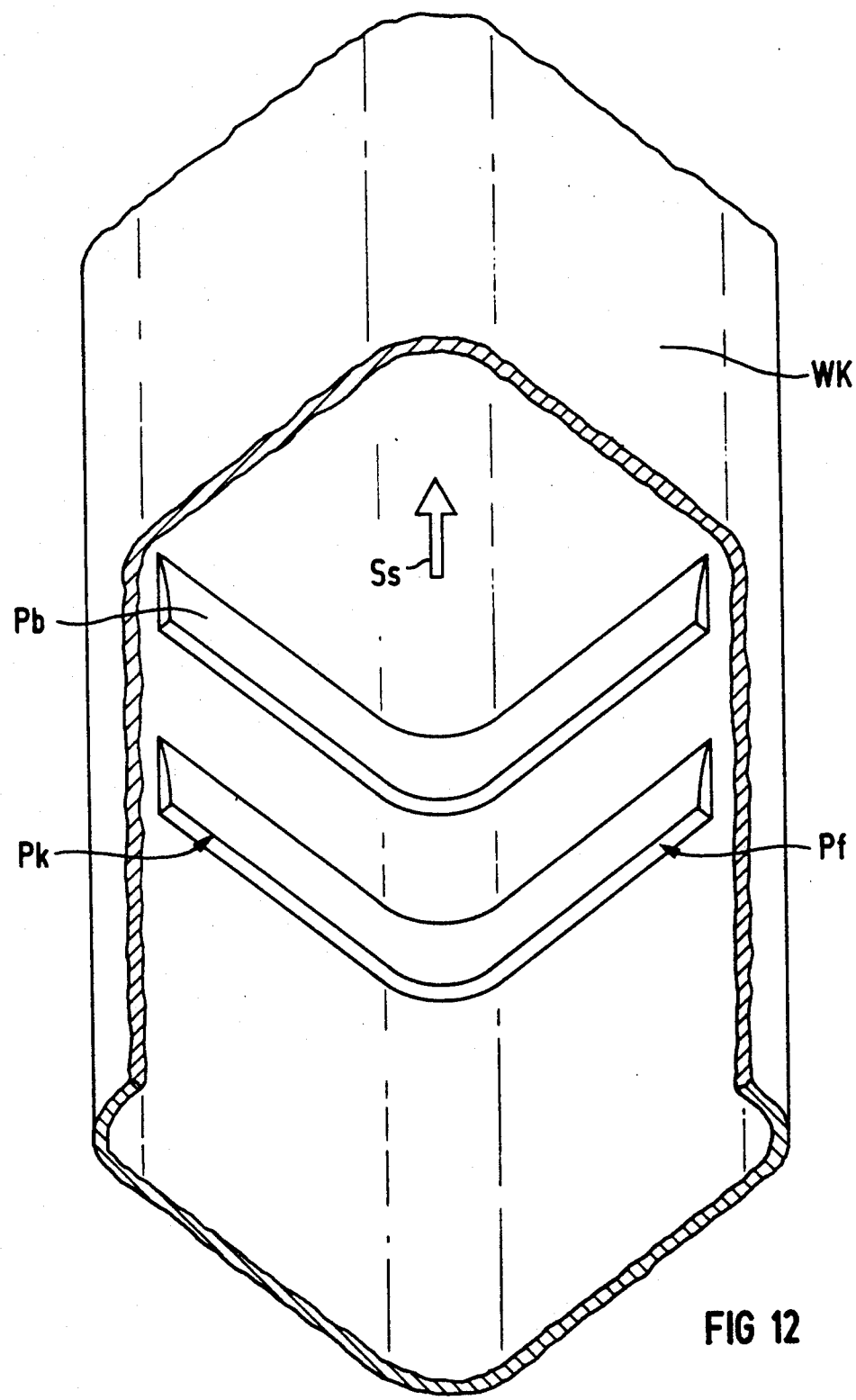
Figure 13:
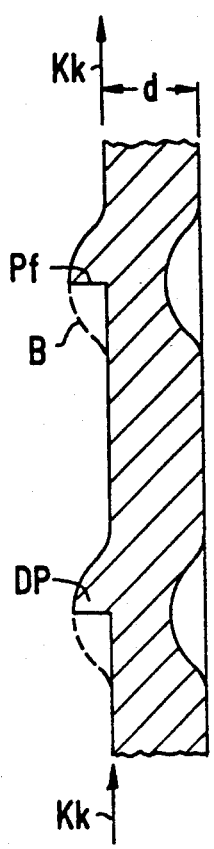
Figure 14:
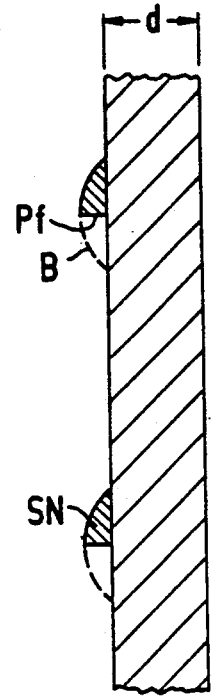
Figure 15:
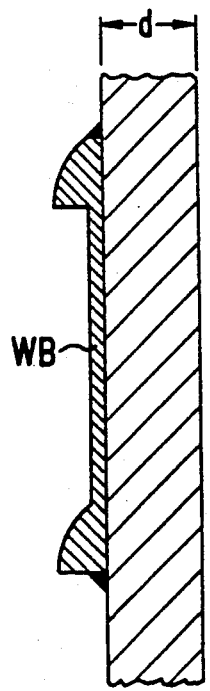
Figure 16:
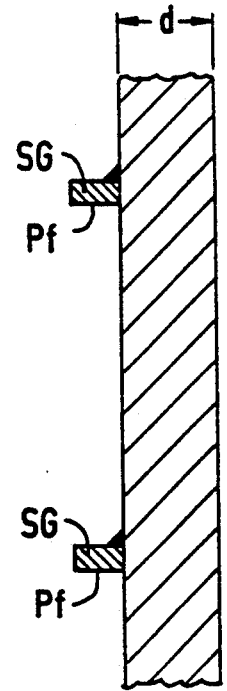

FIG. 9 is a longitudinal-sectional view of a case wall, a spacer, a liquid film at the case wall, and a coolant flow including steam and droplets, in which the case wall does not have a flow tripper; FIG. 10 is a view similar to FIG. 9 of a case wall with a flow tripper which is constructed as a groove, in accordance with the prior art known from U.S Pat. No. 4,749,543;

FIG. 11 is another view similar to FIG. 9 of a case wall with a flow tripper according to the invention;

FIG. 12 is a fragmentary, partly broken-away perspective view of a fuel assembly case with a first embodiment of the flow tripper according to the invention;

FIG. 13 is a fragmentary, cross-sectional view of a case wall according to a preferred embodiment of the invention, in which bulges of the flow tripper are produced by deformation of wall elements having a constant thickness, and impact surfaces are produced by subsequent mechanical removal of material;

FIG. 14 is a view similar to FIG. 13 of another advantageous flow tripper, in which the bulges are formed by the application of welding material, and the impact surfaces are produced by mechanical removal of the welding material;

FIG. 15 is another view similar to FIG. 13 of a further advantageous embodiment of the flow tripper, which is constructed as a corresponding molded part; and FIG. 16 is a further view similar to FIG. 13 of an advantageous embodiment in which the bulges are constructed as ribs that are mounted at a right angle.

Figure 1:
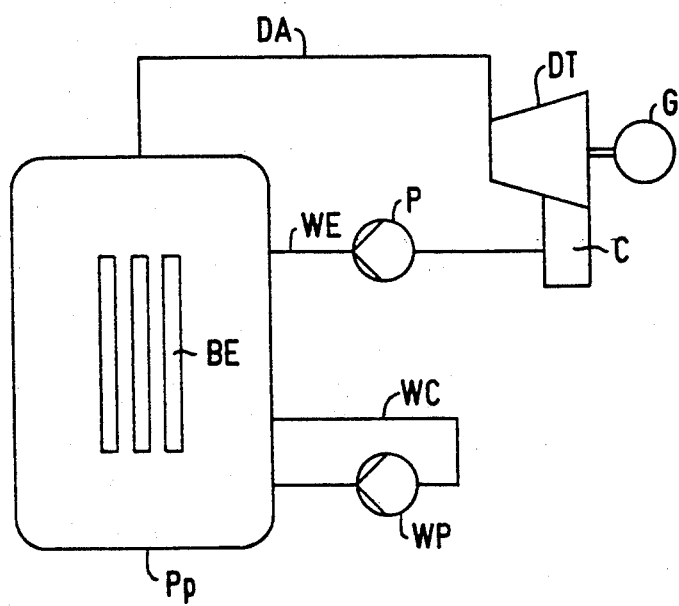
FIG. 1 is a schematic circuit diagram illustrating the principle of a boiling water reactor.

Referring now to the figures of the drawing in detail and first, particularly, to FIG. 1 thereof, there is seen a boiling water nuclear reactor having a pressure vessel Pp, in which a reactor core with vertically oriented fuel assemblies BE is disposed. A steam outlet line DA leads to a steam turbine DT, which drives a generator G. Water condensed in a condenser C is delivered through a feed water pump P to a water input line WE of the pressure vessel.

Unevaporated water in the fuel assemblies is also recirculated through a water cycle or circuit WC and a coolant pump WP.

Figure 2:
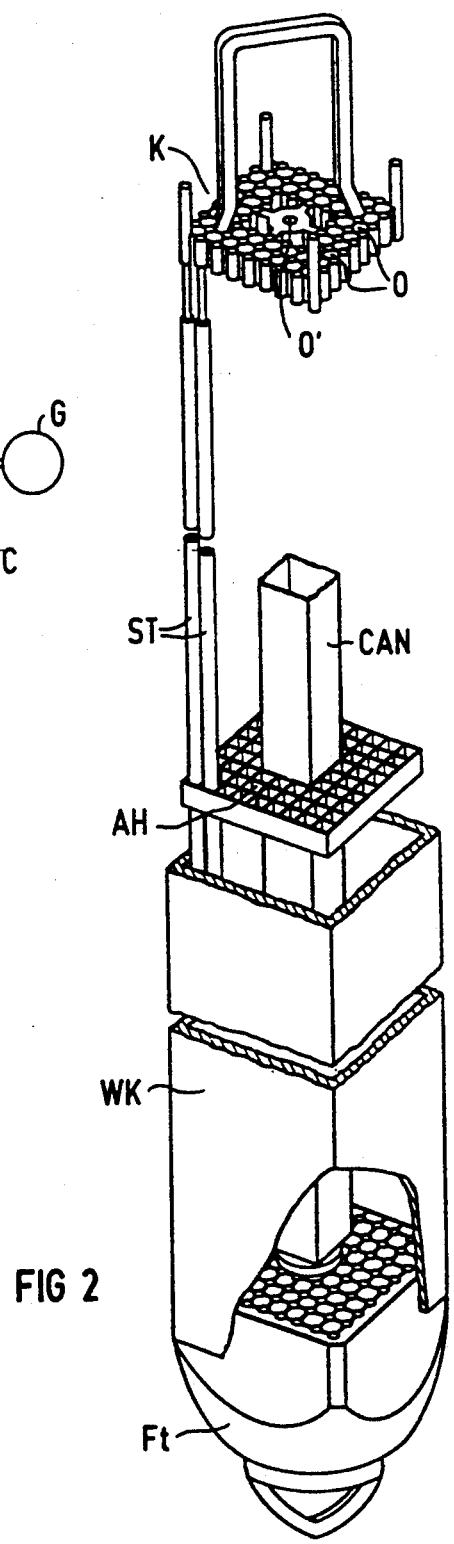
FIG. 2 is a fragmentary, diagrammatic, partly broken-away perspective view of a fuel assembly for the boiling water reactor.

The fuel assemblies BE located in the pressure vessel contain vertically disposed rods ST shown in FIG. 2, which are held at the bottom in a base or base part Ft and at the top in a cap or head part K and are laterally surrounded by a water case, box or duct WK. The cap part K has outlet openings O for a water/steam mixture, which are connected through other non-illustrated components, such as for drying the steam, in a closed cycle or circuit with the steam turbine DT. Corresponding inlet openings on the base part cannot be seen.

The fuel rods are fixed in the case by spacers AH, which extend transversely between the fuel rods. While FIG. 2 shows only one spacer, normally from 5 to 7 such spacers are disposed in succession in the case, at approximately equal intervals.

A water channel or duct CAN for non-boiling water preferably extends longitudinally relative to the case and is connected to the cycle or circuit of the pumps P and WP through corresponding inlet openings in the base Ft and a corresponding outlet opening O' in the cap K.

Figure 3:
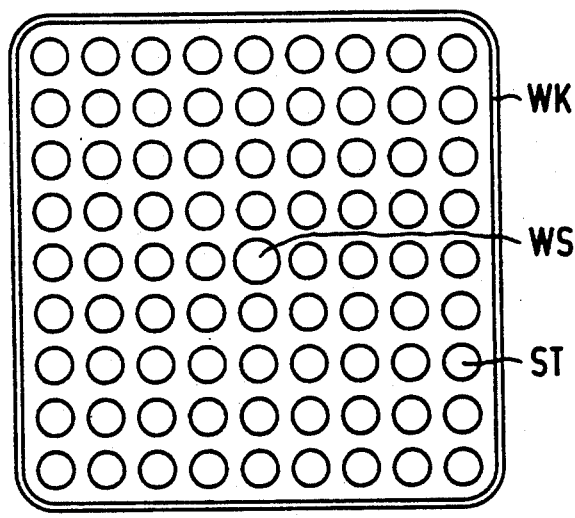
FIG. 3-8 are cross-sectional views of a fuel assembly case with fuel rods and inner walls, some of which form water channels carrying non-boiling water and some of which form reinforcing walls for the fuel assembly case.

In the cross section through the water case WK shown in FIG. 3, the fuel assemblies are disposed in the meshes or mesh openings of a regular, rectangular grid that has 9×9 positions for the fuel rods ST. However, instead of a fuel rod, the center of the fuel assembly has a water channel or duct, which is a so-called "water rod" WS and in this instance is formed of a tubular inner wall in the case.

Figure 4:
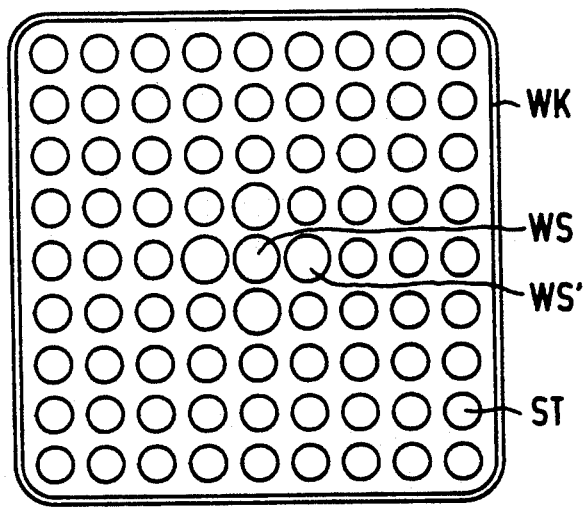

In FIG. 4, the water case WK, for which a polygonal cross section has advantageously been selected, also has a square cross section. In this instance, however, a plurality of inner walls have been provided with corresponding water rods WS, WS'. In this case, only 9×9−5 positions for the fuel rods ST remain.

Figure 5:
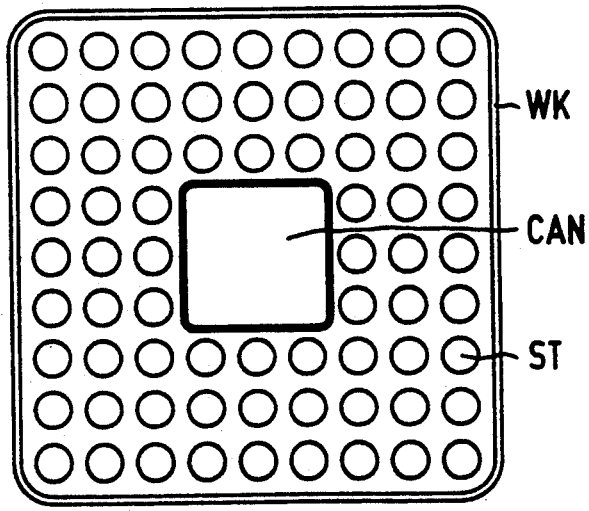

A water channel CAN having the square cross section already shown in FIG. 2 has proved to be particularly advantageous. In FIG. 5, 9×9−9 fuel rods ST can be accommodated with the water channel CAN.

Figure 6:
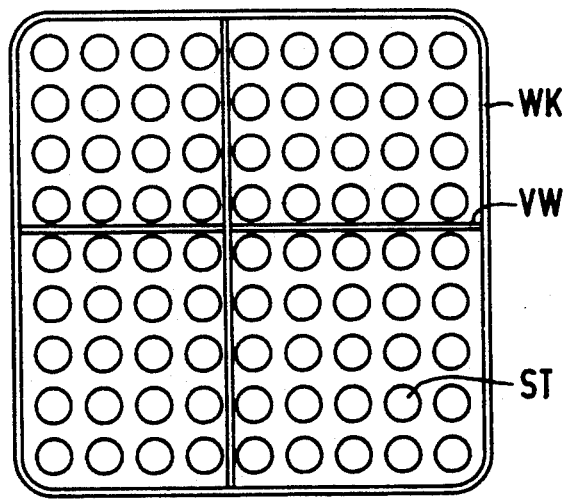

FIG. 6 shows a different preferred embodiment, in which opposed walls of the case are joined to one another by inner walls, that are each parallel to case walls if a polygonal cross section is used. In the quadratic form of FIG. 6, the result is a cross-shaped structure of reinforcing inner walls VW. Such reinforcing inner walls VW allow the fuel assembly to have a high feed pressure for the water, with an increased flow speed which can thus lead to increased steam production, despite relatively thin case walls WK. In order to compensate for pressure differences in the various quadrants of the case, perforations or other openings may be provided in the reinforcing walls VW, which extend longitudinally over practically the entire length of the case.

Figure 7:
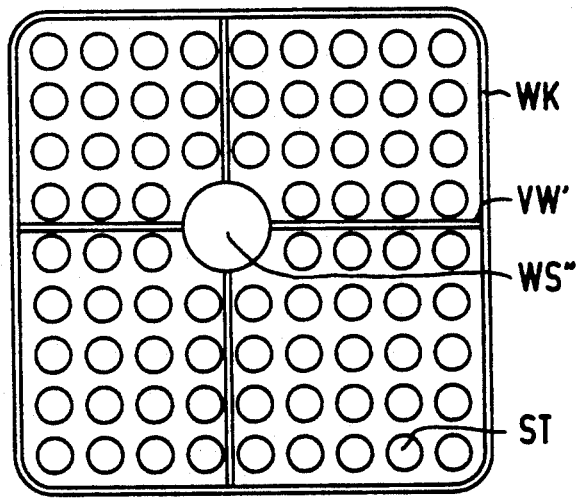

In the cross section of FIG. 7 as well, inner walls are provided in the interior of the case, but some of them form a water rod WS", which in this instance is relatively large, while some are constructed as reinforcing walls VW', which join the opposed case walls together through the water rod. In contrast to FIGS. 3-5, the water channel formed by the water rod WS" is not disposed strictly centrally within the case but rather is shifted somewhat to the side.

Figure 8:
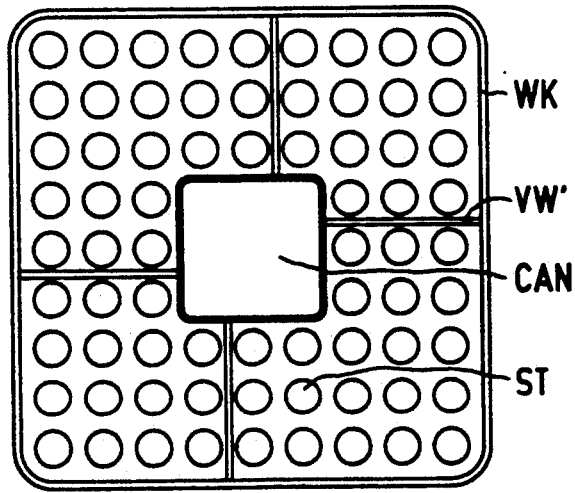

FIG. 8 shows a central water channel CAN formed by some of the inner walls, which is joined to the case walls through another group of inner walls that serve as reinforcing walls VW', as in FIG. 7.

FIG. 9 shows a longitudinal section of a wall of the fuel assembly case WK. An arrow Ss indicates a flow direction in which the water in the lower portion and a mixture of water vapor and water droplets in the upper portion of the fuel assembly flow along the lateral surface of the wall of the case WK facing toward the fuel rods. No evaporation takes place at the wall of the case WK, which protrudes out of the cooler lower portion of the fuel assembly into the upper, steam-carrying space of the fuel assembly and is cooled by the non-boiling water outside the fuel assembly. Instead, water creeps upward in the form of a film F.

The spacer AH has a rib or web shown in FIG. 9 with a long side having an edge AK that is constructed as a flow tab or baffle and protrudes into the steam flow in such a way that droplets TR contained in the flow are diverted from their horizontal flow direction and spun into the direction of the fuel rods. The result is a partial separation of a droplet flow Tr from the water vapor flowing in the direction of an arrow Dp and more liquid water being supplied to the fuel rods.

This separation action is increased if the spacers AH, or the edges AK of the ribs thereof which are formed into flow tabs or baffles, are preceded by flow trippers, as seen in the flow direction.

As seen in FIG. 10, the profile on the inside of the case walls extends rectilinearly in an alignment Kk—Kk parallel to the flow direction, upstream and downstream of the flow trippers, as seen in the flow direction. The flow tripper of the prior art shown in FIG. 1? is constructed as a groove N which, as seen in succession in the flow direction, firstly includes a ramp or sloped surface machined into the case wall having a ramp alignment Rr, then enlarges in cross section, and finally ends in an edge Nk perpendicular to the flow direction.

In order to ensure that the liquid film will in fact detach and be entrained as droplets by the coolant flow Ss, the loped surface with the alignment Rr must be sufficiently wide. Otherwise, the coolant flow in the region of the flow tripper would hardly be diverted at all from its normal longitudinal direction. In the least favorable case, the grooves would fill with liquid alone, and in the most favorable case, although droplets would form, they would soon be deposited on the wall again in the form of a film, since a speed component oriented into the interior of the case, or in other words aimed at the fuel rods, would hardly be imparted to them.

Accordingly, in order to attain the improved cooling output sought, the grooves must be sufficiently wide and deep. However, although this is entirely desirable with a view toward widening the flow cross section and lessening the pressure drop for the coolant liquid, it is highly undesirable for the mechanical strength of the case.

According to the invention, as shown in FIG. 11, the profile on the inner wall of the case is curved inward into the interior of the case in the vicinity of the flow tripper, thereby reducing the inner cross section of the case that is available for the coolant flow. However, the "front sloped surface" (that is, the side of the inwardly curved profile of the inner surface of the case that faces into the liquid flow) is constructed as an impact surface Pf that is perpendicular to the liquid flow. Even if this impact surface Pf that extends perpendicular to the longitudinal direction is relatively narrow, the coolant flow at that location causes detachment or breaking away of the film F, and the resultant droplets TR are given an increased speed component in the direction of an arrow Tr' at the impact surface Pf.

While the steam is diverted in the direction of an arrow Dp' at the sloped surface of the profile facing away from the coolant flow, the droplets TR continue to be spun into the interior of the case, resulting in effective separation of steam and droplets at the flow tripper.

Flow trippers of this kind are provided above all in the upper portion of the fuel assembly, where steam production occurs, or in other words approximately in the vicinity of the upper third of the fuel rods.

It is unnecessary for the sloped surface that faces away to be as flat as is shown in FIG. 11. FIG. 12 shows that the sloped surface, which is constructed as the impact surface Pf, can extend around the entire inner cross section of the fuel assembly case WK. A remote, "rear" sloped surface Pb, at which the temporarily narrowed flow cross section widens again, may belly outward. It is merely advantageous for the transition between the two sloped surfaces to form an impact edge Pk that is rounded as little as possible and instead is sharp (for instance at a right angle or acute angle). This promotes detachment or separation of the flow and reinforces the perpendicular flow component Tr' of the droplets.

The details of the construction of the flow tripper can be varied to meet the needs of economical manufacture. For instance, the fuel assembly case of FIG. 12 may be manufactured with trippers extending transversely to the alignment in the form of corresponding inwardly oriented bulges of a semi-finished part, and the impact surface Pf having the impact edge Pk can be made by subsequent mechanical retouching.

It is also possible, for instance, to first make a case in which wall parts that are intended for the flow trippers have essentially constant thickness. The bulges are made by bending these wall parts, with the impact surfaces being made in them subsequently by removing the excess wall material from the sloped surfaces B facing into the coolant flow, as shown in FIG. 13. In a case having a square cross section and rounded corners, bumps (or dimples) DP created by bending may extend over the entire square cross section, which has proved to be advantageous. However, depending on the manufacturing process, the region of the rounded corners may be spared instead.

The parts of the wall carrying the bumps have practically a constant thickness d in FIG. 13, which is reduced only on the side facing into the flow by the incorporation of the impact surface. This reduced wall thickness is virtually no impairment in terms of mechanical strength, i.e., in terms of accommodating problematic bulging of the case in response to a pressure difference between the interior and exterior of the case, because firstly even a slight removal of material causes turbulence in the liquid film and secondly the wall at these points already has increased mechanical strength because of the inwardly oriented bending.

In the configuration of FIG. 14, additional wall material has been applied to the corresponding wall parts having the constant thickness d. This is most simply accomplished by welding on the additional wall material. In this case, the additional wall material itself is formed of welding material. Accordingly, in FIG. 14, transversely extending weld seams SN are applied to the inside of the case. The disturbing or undesirable sloped surfaces B are removed by mechanical machining, and the corresponding impact surfaces Pf are formed. In FIG. 15, reinforcing metal sheets WB are welded to the wall parts having a constant thickness as additional wall material, and the bulges are formed by a thickening of the reinforcing sheets.

As shown in FIG. 16, ribs SG can also be welded perpendicularly to the wall, in other words perpendicularly to the alignment, as additional wall material.

The additionally applied wall material also reinforces the case which has a wall thickness that can therefore be selected to be relatively small. In order to lend sufficient rigidity to the entire case despite such a wall thickness, the reinforcing sheets VW and VW' shown in FIG. 6-8 may be provided. In order to improve the neutron flow, the water and channels mentioned in conjunction with FIGS. 3-5 may also be advantageous. In this regard, inner walls that extend between the fuel rods and are parallel to the case wall may also be provided with impact surfaces extending perpendicularly to the flow direction. These additional impact surfaces on the inner walls may be constructed as shown in FIGS. 13-15. In the case of impact surfaces that protrude into the interior of the case and would reduce the flow cross section, if difficulties should arise because of an increased pressure drop and/or an increase in the space available, then flow trippers of the type shown in FIG. 10 may be provided for these inner surfaces.

In each case, the flow trippers are at their most effective if they are disposed upstream of corresponding spacers, as seen in the flow direction and as seen in FIG. 11.

We claim:

1. Fuel assembly for boiling water reactor, comprising an elongated case having an interior and inner surfaces, a base part having inlet openings discharging into the interior of said case for coolant flowing in a given flow direction, a head part having outlet openings leading out of the interior of said case for the coolant flowing in said given flow direction and at a given coolant flow cross section, mutually parallel fuel rods containing nuclear fuel and being disposed in said case between said base and head parts, said inner surfaces of said case having a profile with a rectilinear alignment as seen in said given flow direction and flow trippers extending transversely to said alignment in the form of bulges protruding inwardly, each of said bulges having an impact surface facing toward the coolant flow substantially perpendicular to said given flow direction for reducing the coolant flow cross section to produce a pressure difference between the interior and exterior of the wall, and a sloped surface facing away from said impact surface for gradually enlarging the coolant flow cross section in said given flow direction.

2. Fuel assembly according to claim 1, wherein said case has wall parts with a substantially constant wall thickness, said bulges are formed by bending said case wall parts, and said impact surfaces are formed by removing material from said sloped surfaces.

3. Fuel assembly according to claim 1, wherein said case has wall parts with a substantially constant wall thickness, and said bulges are formed of additional wall material disposed on said case wall parts.

4. Fuel assembly according to claim 3, wherein said additional wall material is welded on.

5. Fuel assembly according to claim 4, wherein said additional wall material is welding material, and said impact surfaces are formed by mechanical removal of part of said welding material.

6. Fuel assembly according to claim 3, wherein said additional wall material is in the form of reinforcing metal sheets welded to said wall parts, and said reinforcing sheets have a profile forming said bulges and said impact surfaces.

7. Fuel assembly according to claim 3, wherein said additional wall material is in the form of ribs being attached to said inner surface of said case and perpendicular to said alignment.

8. Fuel assembly according to claim 1, wherein said case has upper and lower portions, and said bulges are disposed only in said upper portion.

9. Fuel assembly according to claim 1, including spacers disposed in said case, said spacers having ribs between said fuel rods extending perpendicular to the longitudinal axis of said case, and each of said bulges being disposed upstream of a respective one of said spacers as seen in said given flow direction.

10. Fuel assembly according to claim 1, including inner walls being attached to said case in the interior of said case, said inner walls having said inner surfaces with said impact surfaces disposed substantially perpendicular to said given flow direction.

11. Fuel assembly for a boiling water reactor, comprising an elongated case having inner surfaces and an interior through which coolant flows in a given flow direction, mutually parallel fuel rods disposed in said case, said inner surfaces of said case being rectilinear as seen in said given flow direction except for flow trippers in the form of inwardly protruding bulges, each of said bulges having an impact surface facing said coolant flow substantially perpendicular to said given flow to produce a pressure difference between the interior and exterior of the wall direction.

* * * * *